(12) United States Patent
Heuer et al.

(10) Patent No.: US 10,131,123 B2
(45) Date of Patent: Nov. 20, 2018

(54) MULTI-LAYER FILM COMPOSITE HAVING A POLYCARBONATE LAYER

(75) Inventors: Helmut Werner Heuer, Leverkusen (DE); Rolf Wehrmann, Krefeld (DE)

(73) Assignee: Covestro AG, Leverkusen (DE)

( * ) Notice: Subject to any disclaimer, the term of this patent is extended or adjusted under 35 U.S.C. 154(b) by 1112 days.

(21) Appl. No.: 13/147,605

(22) PCT Filed: Jan. 27, 2010

(86) PCT No.: PCT/EP2010/000462
§ 371 (c)(1),
(2), (4) Date: Aug. 3, 2011

(87) PCT Pub. No.: WO2010/089042
PCT Pub. Date: Aug. 12, 2010

(65) Prior Publication Data
US 2011/0293912 A1 Dec. 1, 2011

(30) Foreign Application Priority Data
Feb. 6, 2009 (DE) ........................ 10 2009 007 762

(51) Int. Cl.
*C08K 5/103* (2006.01)
*B32B 27/36* (2006.01)
*B42D 25/23* (2014.01)
*B32B 27/08* (2006.01)
*B32B 27/18* (2006.01)
*G06K 19/077* (2006.01)
*B42D 25/00* (2014.01)
*B32B 27/06* (2006.01)
*B32B 27/20* (2006.01)
*B42D 25/455* (2014.01)
*B42D 25/46* (2014.01)

(52) U.S. Cl.
CPC ............ *B32B 27/365* (2013.01); *B32B 27/06* (2013.01); *B32B 27/08* (2013.01); *B32B 27/18* (2013.01); *B32B 27/20* (2013.01); *B42D 25/00* (2014.10); *B42D 25/23* (2014.10); *C08K 5/103* (2013.01); *G06K 19/077* (2013.01); *B32B 2250/24* (2013.01); *B32B 2262/101* (2013.01); *B32B 2264/101* (2013.01); *B32B 2307/4026* (2013.01); *B32B 2307/412* (2013.01); *B32B 2307/50* (2013.01); *B32B 2307/75* (2013.01); *B32B 2425/00* (2013.01); *B32B 2429/00* (2013.01); *B42D 25/455* (2014.10); *B42D 25/46* (2014.10); *B42D 2033/30* (2013.01); *Y10T 156/10* (2015.01); *Y10T 428/31507* (2015.04)

(58) Field of Classification Search
CPC .................................................... C08K 5/103
USPC ......................................................... 428/220
See application file for complete search history.

(56) References Cited

U.S. PATENT DOCUMENTS

| 2,991,273 | A | 7/1961 | Hechelhammer et al. |
| 2,999,835 | A | 9/1961 | Goldberg |
| 2,999,846 | A | 9/1961 | Schnell et al. |
| 3,148,172 | A | 9/1964 | Fox |
| 3,271,367 | A | 9/1966 | Schnell et al. |
| 4,982,014 | A | 1/1991 | Freitag et al. |
| 5,116,547 | A | 5/1992 | Tsukahara et al. |
| 5,235,026 | A | 8/1993 | Wulff et al. |
| 5,928,788 | A | 7/1999 | Riedl |
| 6,008,280 | A | 12/1999 | Krishnan et al. |
| 6,344,507 | B1 * | 2/2002 | Wylin ........................... 524/312 |
| 6,359,042 | B1 * | 3/2002 | Anders et al. ................. 524/91 |
| 2003/0060593 | A1 * | 3/2003 | Funakoshi et al. ........... 528/196 |
| 2005/0090593 | A1 * | 4/2005 | Heuer et al. .................. 524/366 |
| 2008/0182094 | A1 * | 7/2008 | Meyer ..................... B32B 27/36 428/220 |

FOREIGN PATENT DOCUMENTS

| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3832396 A1 | 2/1990 |
| DE | 4023933 A1 | 1/1991 |
| DE | 102007004332 A1 | 7/2008 |
| EP | 0517044 A2 | 12/1992 |
| EP | 0640940 A2 | 3/1995 |
| EP | 0706152 A2 | 4/1996 |
| EP | 1664174 A1 | 6/2006 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| JP | 2004330541 A | 11/2004 |
| WO | WO-99/05205 A1 | 2/1999 |
| WO | WO-00/15707 A1 | 3/2000 |
| WO | WO-2002/41245 A2 | 5/2002 |

OTHER PUBLICATIONS

Morgan, P.W., *Condensation Polymers by Interfacial and Solution Methods* (1965), vol. 10, Chapter VIII, pp. 325-393, Polymer Reviews, Interscience Publishers, New York.

* cited by examiner

*Primary Examiner* — Michael F Pepitone
(74) *Attorney, Agent, or Firm* — Drinker Biddle & Reath LLP

(57) ABSTRACT

The invention relates to a multi-layer film composite having at least one layer made of polycarbonate or copolycarbonate, characterized in that the polycarbonate or copolycarbonate comprises at least one additive of the general formulas (1) to (8), R1 are selected independently of each other from the group made of C10-C25-alkyl, C10-C25-alkoxy, and C10-C25-alkyl-substituted aryl, R2 are selected independently of each other from the group of C10-C25-alkylcarbonyl or hydrogen, and R3 are selected independently of each other from the group of C10-C25-alkyl.

13 Claims, 1 Drawing Sheet

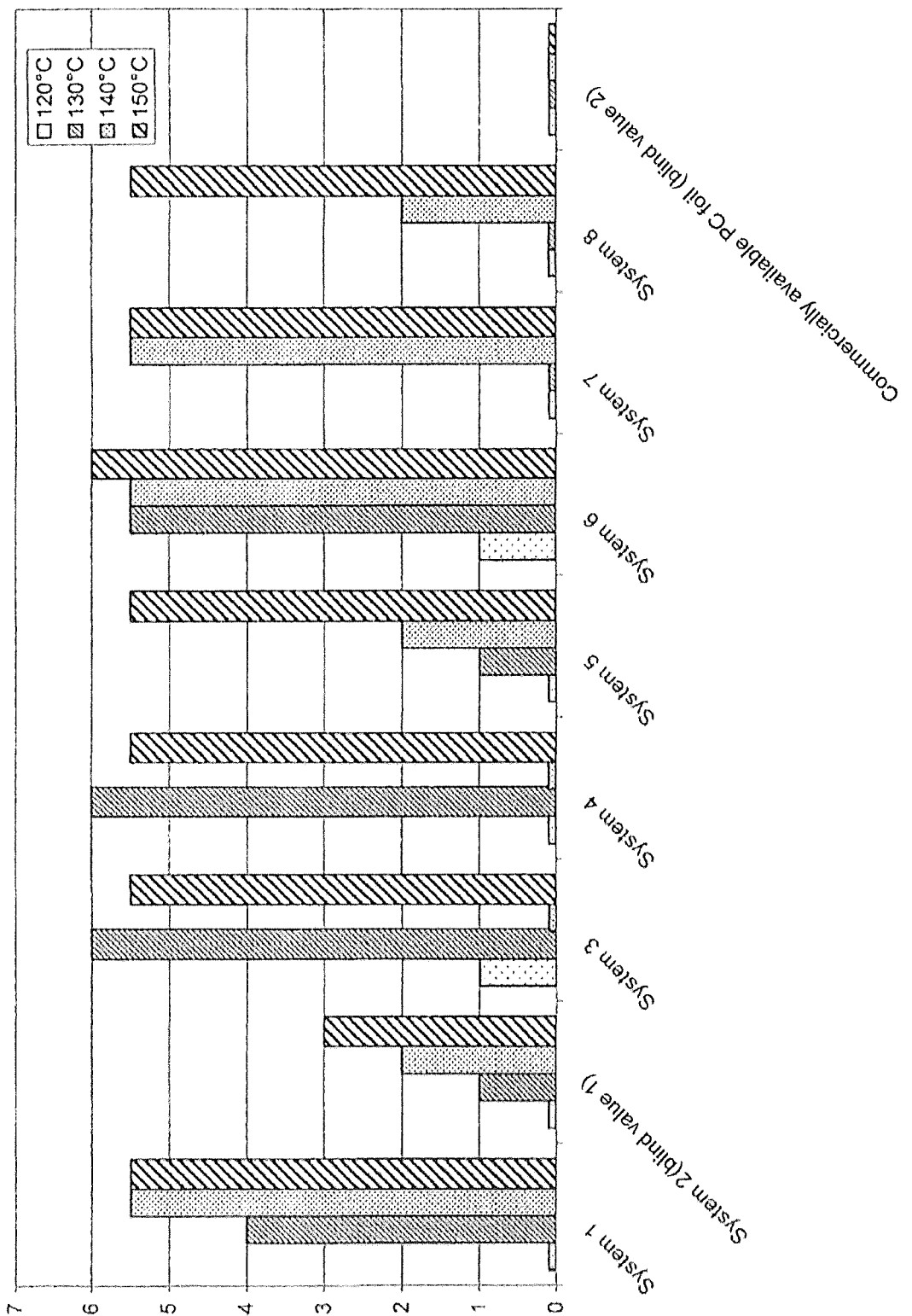

MULTI-LAYER FILM COMPOSITE HAVING A POLYCARBONATE LAYER

CROSS-REFERENCE TO RELATED APPLICATIONS

This application is a national stage application (under 35 U.S.C. § 371) of PCT/EP2010/000462, filed Jan. 27, 2010, which claims benefit of German application 10 2009 007 762.6, filed Feb. 6, 2009, both of which are incorporated herein by reference in their entirety for all their useful purposes.

BACKGROUND

The invention relates to a multilayer foil composite which has at least one layer composed of polycarbonate or copolycarbonate, characterized in that the polycarbonate or copolycarbonate also comprises one or more specific additives.

Extruded foils composed of polycarbonate, polyester carbonate or else blends composed of PC and of polyesters, such as polyethylene terephthalates, polybutylene terephthalates or polycyclohexanedimethanol cyclohexanedicarboxylate (PCCD) are used especially in the electronics sector, for decorative and functional panels in the domestic-equipment sector, as topcoat foils, e.g. for sports items, and for ID cards and blister packs, examples of trademarks being Lexan SLX® and XYLEX® (both from Sabic Innovative Plastic). Further application sectors are found in the automobile construction sector, examples being bodywork parts or exterior mirrors, or in the telecommunications sector, an example being mobile-telephone casings and mobile-telephone keypads. The foils feature high transparency, impact resistance and heat resistance.

One particular sector that uses substrate materials for the production of foils is that of portable data carriers. There are many applications that use portable data carriers, in a very wide variety of embodiments. The portable data carriers here often have an inscription, or have security features incorporated, or have a magnetic strip and/or an integrated circuit. In particular, the portable data carriers can have been designed as plastics cards with standard dimensions, and can be used by way of example for cashless-payment transactions, or as proof of authority for access to a mobile-telephone network, etc. There are also known portable data carriers generally integrated as a page in a passbook and generally having lower thickness but larger area than standard plastics cards.

Because portable data carriers are widely used, another increasingly important factor, alongside production costs, is the environmental compatibility of the materials used. In most applications, another requirement is that the portable data carriers have a long lifetime. Furthermore, the portable data carriers are increasingly provided with inscriptions and add-on elements, with a simultaneous increase in the level of associated quality requirements.

One known process for the production of high-quality portable data carriers is lamination from a plurality of plastics foils. However, the production of complex-structure portable data carriers from a large number of individual foils is complicated and subject to severe restrictions in terms of selection of materials, in particular for adjacent individual foils. The individual foils moreover have to have a certain minimum thickness, to permit handling. Production of portable data carriers has therefore already switched to use of coextruded foils composed of a plurality of layers. During the process for producing these materials, the individual layers are bonded to give a multilayer foil. A plurality of the said multilayer foils can then be bonded to one another by lamination.

This type of procedure is known by way of example from EP-A 0 640 940, which discloses a contactless chip card having a core foil arranged between two topfoils. Each of the topfoils has been bonded by means of a bonding layer to the core foil. Each bonding layer has in particular been designed as a layer coextruded with the topfoils and/or with the core foil. The topfoils and the core foil are composed by way of example of polycarbonate. The bonding layers can be composed of a modified polyester termed PETG.

U.S. Pat. No. 5,928,788 discloses inter alia a multilayer data carrier, produced via lamination of a core foil and of two topfoils. The core foil and the topfoils are in particular composed of PETG. In order to prevent excessive adhesion to the plates of the laminating press, the outer region of the topfoils has an increased concentration of "antiblock" substances. To this end, each of the topfoils is coextruded from two layers, but only one of these layers comprises the antiblock substances.

WO 2002/41245 A2 discloses a multifunctional card body formed from a plurality of foils bonded to one another via lamination, where at least one foil is composed of at least two coextruded layers. In particular, a core foil has been bonded bilaterally in each case to a topfoil. Each of the topfoils can have been designed as a coextruded polycarbonate foil with two or three coextruded layers. The core foil can have two different types of coextruded layers. The two types of coextruded layers follow each other in alternation, and one layer structure here is formed from three or five alternating coextruded layers. One type of coextruded layer can be composed of polycarbonate or polyethylene terephthalate (PET). The other type of coextruded layer can be composed of a thermoplastic elastomer.

EP-A 0 706 152 discloses laminated chip cards or smart cards composed of thermoplastic materials. The said composite produced from laminatable foils has marked advantages over cards produced via a complicated adhesion process, e.g. by means of cyanoacrylate adhesives.

Polycarbonate is particularly suitable for the foils described above, because of its good mechanical properties.

Polycarbonates with additives from the class of the mould-release agents have been described by way of example in WO 99/05205 A or U.S. Pat. No. 6,008,280. These polycarbonates are used by way of example as substrate materials for optical data carriers, since these materials have better processing properties in the injection-moulding process. However, there is no description of card applications as described above, or lamination properties, of polycarbonates thus modified.

DE 10 2007 004 332 discloses multilayer composite materials comprising at least one layer of polycarbonate, optionally comprising mould-release agent, for example pentaerythritol tetrastearate and glycerol monostearate, preferably in an amount of from 0.02 to 1% by weight. Both of the compounds mentioned are within the group of additives 1-8 according to the invention. The usual function of mould-release agents is, as the name indicates, to act as release agents. As such, the said agents are known to have relatively good adhesion-inhibiting properties. It is not therefore possible to conclude from the cited document that the mould-release agents mentioned, in relatively high concentrations, have adhesion-improving properties.

The finished card body or multilayer composite material is in particular produced via a lamination press, in which the foil bundle is intimately bonded with exposure to pressure.

It is advantageous here if at least one of the core foils or of the topfoils has a very favourable tendency towards adhesion during the lamination process. The result can be an accelerated process of producing the said foil composites. Furthermore, there is an improvement in the adhesion of the topfoils on the core foil. The said core foil can be a transparent and/or coloured foil, and can have good mechanical properties. The topfoils can moreover be laser-printable. It is therefore preferable here to use polycarbonate.

However, foils composed of polycarbonate have the disadvantage of a high processing temperature in the lamination process. Furthermore, a prolonged period is needed for lamination of the foils. The result is prolongation of the lamination cycles described above, and a requirement for long production times. Delamination can also occur during use of the finished foil laminate, because of inadequate adhesion between the foils.

BRIEF DESCRIPTION OF PREFERRED EMBODIMENTS

It was therefore an object to provide a foil which can produce a multilayer system and which complies with the requirements for good mechanical properties and which, when compared with the prior art, exhibits improved laminatability, improved adhesion during lamination, and improved processability. At the same time, the said improved foil is intended to comply with possible requirements for transparency, colourability and laser-printability.

Surprisingly, the object was achieved via provision of a multilayer composite material which is characterized in that it has at least one foil/layer comprising polycarbonate or copolycarbonate, and in that the polycarbonate or copolycarbonate also comprises one or more additives selected from the group of the compounds of the general formulae (1) to (8):

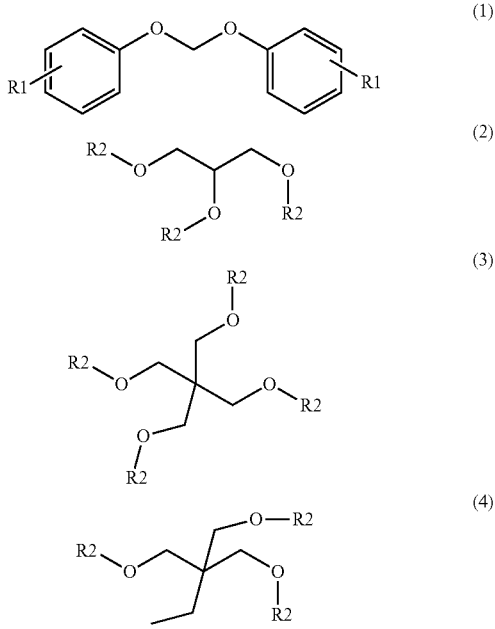

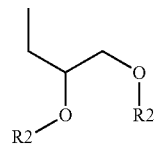

(5)

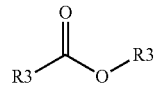

(6)

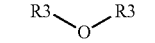

(7)

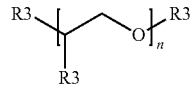

(8)

in which
R1 have been selected independently of one another from the group consisting of C10-C25-alkyl-, C10-C25-alkoxy-, and C10-C25-alkyl-substituted aryl, where the expression "C10-C25-alkyl" represents a linear or branched hydrocarbon moiety having from 10 to 25 carbon atoms, in particular linear C12-C20-alkyl and very particularly pentadecyl, and where the expression "C10-C25-alkyl-substituted aryl" represents a phenyl or naphtyl moiety substituted with C10-C25-alkyl moieties,
R2 have been selected independently of one another selected from the group of C10-C25-alkylcarbonyl or hydrogen and
R3 have been selected independently of one another selected from the group of C10-25-alkyl,
where the expression "C10-C25-alkyl" in R2 and R3 represents a linear or branched hydrocarbon moiety having from 10 to 25 carbon atoms, in particular linear C12-C20-alkyl and very particularly C12-C18-alkyl.

Preference is given to, for example, pentaerythritol tetrastearate, glycerol monostearate, propanediol distearate, and stearyl stearate. They are used alone or in a mixture, preferably in an amount of from 1 to 10%, with preference from 1.1 to 8% by weight, with particular preference from 1.5 to 7% by weight, and with very particular preference from 2.1 to 6% by weight, based on the weight of the composition.

Surprisingly, it has been found that this type of multilayer composite material has the properties demanded above.

BRIEF DESCRIPTION OF THE DRAWINGS

FIG. 1 illustrates a graph which compares the results of evaluation and grading testing of various foils

DETAILED DESCRIPTION OF PREFERRED EMBODIMENTS

The phrase "multilayer foil composite" here means a material composed of 2, 3, 4, 5 or more layers bonded to one another, e.g. via coextrusion or lamination. The layers here can be composed of the same, or different, materials. Even when layers are mainly composed of the same material, for the purposes of the present invention these are nevertheless different layers if, for example, are applied in separate steps of an operation or comprise different additives.

The phrase "at least one layer" means that the multilayer foil composite can have one or more of these layers.

Suitable polycarbonates for the production of the plastics composition of the invention are any of the known polycarbonates. These are homopolycarbonates and thermoplastic polyester carbonates, and also copolycarbonates, in which any desired mixture of bisphenolates can be used. They preferably have average molar masses Mw of from 18 000 to 40 000 g/mol, preferably from 26 000 to 36 000 g/mol and in particular from 28 000 to 35 000 g/mol, determined via gel permeation chromatography (GPC) using polycarbonate as calibration substance.

Examples of diphenols suitable for the production of the polycarbonates to be used are hydroquinone, resorcinol, dihydroxybiphenyl, bis(hydroxyphenyl)alkanes, bis(hydroxyphenyl)cycloalkanes, bis(hydroxyphenyl)sulphides, bis(hydroxyphenyl)ethers, bis(hydroxyphenyl) ketones, bis(hydroxyphenyl)sulphones, bis(hydroxyphenyl)sulphoxides, α,α'-bis(hydroxyphenyl)diisopropylbenzenes, and also the alkylated, including ring-alkylated, and ring-halogenated compounds derived from these.

Preferred diphenols are 4,4'-dihydroxybiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC).

Particularly preferred diphenols are 4,4'-dihydroxybiphenyl, 1,1-bis(4-hydroxyphenyl)phenylethane, 2,2-bis(4-hydroxyphenyl)propane (bisphenol A, BPA), 2,2-bis(3-methyl-4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

These and other suitable diphenols are described by way of example in U.S. Pat. Nos. 2,999,835, 3,148,172, 2,991,273, 3,271,367, 4,982,014 and 2,999,846, in the German laid-open specifications 1 570 703, 2 063 050, 2 036 052, 2 211 956 and 3 832 396, in the French patent specification 1 561 518, in the monograph "H. Schnell, Chemistry and Physics of Polycarbonates, Interscience Publishers, New York 1964, pp. 28ff.; pp. 102ff.", and in "D. G. Legrand, J. T. Bendler, Handbook of Polycarbonate Science and Technology, Marcel Dekker New York 2000, pp. 72ff.".

In the case of the homopolycarbonates only one diphenol is used, but in the case of the copolycarbonates a plurality of diphenols are used, and it is self-evident here that the bisphenols used, like all of the other chemicals and auxiliaries added to the synthesis reaction, can have contamination by the impurities deriving from the synthesis, handling and storage of these compounds, although it is desirable to operate with raw materials of maximum purity.

To control molecular weight, monofunctional phenols can be used, examples being phenol, p-tert-butylphenol, isooctylphenol, cumylphenol, or the chloroformic esters of these, or acyl chlorides of monocarboxylic acids or of mixtures of these.

The amount of chain terminators is in each case from 0.1 to 10 mol %, based, in the case of the phenolic chain terminators, on moles of diphenols.

The production of the polycarbonates to be used can also use bifunctional compounds added as branching agents to the during the synthesis reaction. It is usual to use trisphenols, quarter phenols, or acyl chlorides of tri- or tetracarboxylic acids, or else a mixture of the polyphenols or of the acyl chlorides.

Examples of some of the compounds that can be used having three or more phenolic hydroxy groups are:
phloroglucinol,
4,6-dimethyl-2,4,6-tri(4-hydroxyphenyl)-2-heptene,
4,6-dimethyl-2,4,6-tri(4-hydroxyphenyl)heptane,
1,3,5-tri(4-hydroxyphenyl)benzene,
1,1,1-tri(4-hydroxyphenyl)ethane,
tri(4-hydroxyphenyl)phenylmethane,
2,2-bis(4,4-bis(4-hydroxyphenyl)cyclohexyl]propane,
2,4-bis(4-hydroxyphenylisopropyl)phenol,
tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole (IBK) and 1,1,1-tri(4-hydroxyphenyl)ethane (THPE).

Preferred polycarbonates, alongside bisphenol A homopolycarbonates, are the copolycarbonates of bisphenol A with up to 15 mol %, based on the total molar amount of diphenols, of diphenols other than those mentioned as preferred or particularly preferred.

Various additives can have been admixed with the polycarbonates described.

Addition of additives serves to prolong service life or to increase colourfastness (stabilizers), to simplify processing (e.g. further mould-release agents as mentioned above, flow aids, antistatic agents), or for adaptation of the properties of the polymer to particular stresses (impact modifiers, such as rubbers; flame retardants, colourants, glass fibres).

These additives can be added individually or in any desired mixture or in a plurality of different mixtures to the polymer melt, and specifically directly during isolation of the polymer or else after melting of pellets in what is known as a compounding step. The form in which the additives here, or a mixture of these, can be added to the polymer melt can be that of solid, of powder, or of melt. Another metering method uses masterbatches or a mixture of masterbatches of the additives, or an additive mixture.

Suitable additives are described by way of example in "Additives for Plastics Handbook, John Murphy, Elsevier, Oxford 1999", in "Plastics Additives Handbook, Hans Zweifel, Hanser, Munich, 2001".

Examples of suitable antioxidants or heat stabilizers are: alkylated monophenols, alylthiomethylphenols, hydroquinones, alkylated hydroquinones, tocopherols, hydroxylated thiodiphenyl ethers, alkylidene bisphenols, O-, N- and S-benzyl compounds, hydroxybenzylated malonates, aromatic hydroxy compounds, triazine compounds, acylaminophenols, esters of β-(3,5-di-tert-butyl-4-hydroxyphenyl)propionic acid, esters of β-(5-tert-butyl-4-hydroxy-3-methylphenyepropionic acid, esters of β-(3,5-dicyclohexyl-4-hydroxyphenyl)propionic acid, esters of 3,5-di-tert-butyl-4-hydroxyphenylacetic acid, amides of β-(3,5-di-tert-butyl-4-hydroxyphenyl)propionic acid, suitable thiosynergists, secondary antioxidants, phosphites and phosphonites, benzofuranones and indolinones.

Preference is given to organic phosphites, phosphonates and phosphanes, and mostly to those in which the organic moieties are composed entirely or to some extent of optionally substituted aromatic moieties.

Suitable complexing agents for heavy metals and for the neutralization of traces of alkali are o/m-phosphoric acids, or fully or partially esterified phosphates or phosphites.

Suitable light stabilizers (UV absorbers) are: 2-(2'-hydroxyphenyl)benzotriazoles, 2-hydroxybenzophenones, esters of substituted and unsubstituted benzoic acids, acrylates, sterically hindered amines, oxamides, 2.8. 2-(2-hydroxyphenyl)-1,3,5-triazines. Preference is given to substituted benzotriazoles.

Polypropylene glycols can be used alone or in combination with, for example, sulphones or sulphonamides, as stabilizers to inhibit damage by gamma radiation.

These and other stabilizers can be used individually or in combination and can be in any of the forms mentioned when they are added to the polymer.

Suitable flame-retardant additives are phosphate esters, i.e. triphenyl phosphate, resorcinol diphosphate, bromine-containing compounds, such as brominated phosphoric esters, brominated oligocarbonates and polycarbonates, and also preferably salts of fluorinated organic sulphonic acids.

Suitable impact modifiers are butadiene rubber with grafted-on styrene-acrylonitrile or methyl methacrylate, ethylene-propylene rubbers with grafted-on maleic anhydride, ethyl and butyl acrylate rubbers with grafted-on methyl methacrylate or styrene-acrylonitrile, and interpenetrating siloxane and acrylate networks with grafted-on methyl methacrylate or styrene-acrylonitrile.

Colourants can also be added, examples being organic dyes or pigments or inorganic pigments, or IR absorbers, individually, in a mixture, or else in a combination with stabilizers, with glass fibres, with (hollow) glass beads, or with inorganic fillers. It is also possible to use carbon black as additive.

Various layer-specific functions of the foils themselves can be achieved via various types of additives.

As exterior layer, the polycarbonate layer of the invention can comprise a laser-sensitive additive. A suitable additive is carbon black or a dye that absorbs infrared light.

When standard lasers are used, specifically the widely used Nd-VAG solid-state lasers with wavelength 1.06 µm, a colour change or a colour transition takes place at the point of impact of the laser on the surface of the material, and high-clarity, high-contrast inscriptions and markings are obtained.

Particularly suitable additives are colour pigments and metal salts, copper hydroxide phosphate iriodin, a pearl-lustre pigment obtainable commercially from Merck, and especially carbon black. The amount of these additives admixed with the polycarbonate of the invention is in particular of the order of magnitude of from a few parts per 1000 to at most 10%.

The polycarbonate layer of the invention can also comprise further inorganic fillers. Examples of suitable inorganic fillers for achieving an opaque or translucent polycarbonate layer are conventional inorganic pigments, in particular metals or metal oxides, such as aluminium oxides, silica, titanites, and also alkali-metal salts, e.g. carbonates or sulphates of calcium or barium. Suitable particulate fillers can be homogeneous and are mainly composed of a material such as titanium dioxide or barium sulphate alone. As an alternative, at least a proportion of the filler can be heterogeneous. By way of example, there can also be a modifier admixed with the actual filler. By way of example, the actual filler can also have been provided with a surface modifier, e.g. with a pigment, with a processing aid, with a surfactant or with any other modifier, in order to improve or alter compatibility with the polycarbonate. In one particular embodiment, the polycarbonate layer comprises titanium dioxide.

The amount of the said inorganic fillers in the polycarbonate is preferably from 2 to 50% by weight, particularly preferably from 3 to 30% by weight.

One of the processes used for producing the polycarbonates to be used for the foils or coextruded foils is the interfacial process. This process for synthesizing polycarbonate is widely described in the literature; by way of example, reference may be made to H. Schnell, Chemistry and Physics of Polycarbonates, Polymer Reviews, Vol. 9, Interscience Publishers, New York 1964 pp. 33 ff., to Polymer Reviews, Vol. 10, "Condensation Polymers by Interfacial and Solution Methods", Paul W. Morgan, Interscience Publishers, New York 1965, Chapter VIII, p. 325, to Dres. U. Grigo, K. Kircher and P. R-Müller "Polycarbonate" in Becker/Braun, Kunststoff-Handbuch [Plastics handbook], Volume 3/1, Polycarbonate, Polyacetale, Polyester, Celluloseester [Polycarbonates, polyacetals, polyesters, cellulose esters], Carl Hanser Verlag Munich, Vienna 1992, pp. 118-145 and also to EP-A 0 517 044. According to the said process, a disodium salt of a bisphenol (or of a mixture of different bisphenols) in aqueous-alkaline solution (or suspension) is used as initial charge and is phosgenated in the presence of an inert organic solvent or solvent mixture, which forms a second phase. The oligocarbonates formed, present mainly in the organic phase, are condensed with the aid of suitable catalysts, to give high-molecular-weight polycarbonates, dissolved in the organic phase. Finally, the organic phase is isolated and the polycarbonate is isolated therefrom via various work-up steps.

Suitable processes for the production of the polycarbonate to be used are the continuous polycarbonate production process using the interfacial process, and also the melt-condensation process.

The individual constituents can be mixed in a known manner either in succession or else simultaneously, and specifically either at room temperature or else at an elevated temperature.

Incorporation of the additives into the compositions of the invention preferably takes place in a known manner via mixing of polymer pellets with the additives at temperatures of from about 200 to 330° C. in conventional assemblies, such as internal kneaders, single-screw extruders and twin-screw extruders, for example by melt compounding or melt extrusion, or by mixing of the solutions of the polymer with solutions of the additives and subsequent evaporation of the solvents in a known manner. The foils are preferably produced by extrusion or coextrusion.

To produce foils via extrusion, pellets of the polycarbonate are introduced into the hopper of an extruder, through which they pass into the plastification system, composed of screw and barrel. The material is conveyed and melted within the plastification system. The plastics melt is forced through a slot die. Between the plastification system and the slot die, the arrangement can have filter equipment, a melt pump, stationary mixing elements and further components. The melt leaving the die passes, if appropriate, onto a polishing calender. The final shaping takes place in the nip of the polishing calender. The shape is finally fixed via cooling—which can, for example, take place on the polishing rolls and in the ambient air, on the respective sides. There is further equipment serving for transport, for application of protective foil, and for wind-up of the extruded foils.

In the case of a coextrusion process, the material for coextrusion is plastified in the same way in one or more further extruders. The coextrusion melt(s) is(are) combined with the main material in a specific coextrusion adapter prior to the die or in a specific coextrusion die. The coextrusion layer can be applied to one or both sides of the base layer. The foils can be subjected to subsequent mechanical operations via thermoforming or surface treatments, for example provision of scratch-resistant coatings, of layers that disperse water droplets, and other functional layers. One or both sides of the foils can have been polished or matted or structured.

The thickness of the foils is from 1 to 2000 µm, preferably from 5 to 1000 µm, very particularly preferably from 10 to 850 µm.

The foils of the invention are particularly suitable for the production of the cards described above, e.g. smart ID cards, chip cards in general, EC cards, credit cards, security cards, passes, RFID tags, driving licenses, etc. The said data carriers are composed of variously structured core and topfoils. Coextruded foils are also used here. The coextruded or other foils of the invention can have been constructed in any desired manner with other foils, for example with conventional polycarbonate foils, or foils composed of polyesters, copolyesters and/or crystalline, semicrystalline or microcrystalline polyesters. Additional use can also be made of foils composed of PVC, ABS, PETG or PET, or mixed forms of these, e.g. PC/ABS. The invention therefore also provides composite systems composed of the said materials and also of the modified polycarbonate. The arrangement of the foils can be selected in various ways as a function of the application. The individual foils or coextruded foils here can have various thicknesses. The data carrier or the card can have symmetrical or asymmetrical structure. The data carrier can by way of example have been designed as one page of a passbook.

It is equally possible to design the data carrier as a plastics card, in particular as a magnetic-strip card or a chip card.

In order to obtain the required properties of the data carrier, the foil of the invention can be metallized, structured or printed—for example with conductor tracks. The screen-printing process can be used for the structuring and printing.

The application of the foils is not restricted to the data carriers described above, and they can also be used in chip semicards, key heads, buttons, armbands, clock constituents, etc.

The examples below provide further explanation of the invention.

EXAMPLES

1. Production of Compounded Polycarbonate Material:

Polycarbonate/additive mixtures were produced, composed of Makrolon M3108 polycarbonate (Bayer MaterialScience AG) and of the additives mentioned in Table 1 (propylene glycol distearate from Faci, Italy; Loxiol G32, and glycerol monostearate from Cognis Oleochemicals, Germany; dimeric pentadecylphenol formal from in-house synthesis by a method based on EP 1664174-B1), in the concentrations there stated. The polycarbonate/additive pellets (compound materials 1-8) based on Makrolon M3108 were produced via compounding in a ZE 25/5 twin-screw extruder from Berstorf at a temperature of 300° C.

TABLE 1

Compounded polycarbonate/additive materials produced

| Compound/system | Propylene glycol distearate, % by wt. | Glycerol monostearate, % by wt. | Loxiol G32, % by wt. | dimeric pentadecylphenol formal, % by wt. |
|---|---|---|---|---|
| 1 |  |  |  | 3.95 |
| 2 | 0 | 0 | 0 | 0 |
| 3 |  |  | 2.20 |  |
| 4 |  |  | 2.90 |  |
| 5 |  | 2.50 |  |  |
| 6 |  | 3.30 |  |  |
| 7 | 2.40 |  |  |  |
| 8 | 3.10 |  |  |  |

2. Production of Foils:

In order to study lamination properties, foils were produced, derived from 20% strength solutions of compounding materials 1-8 in methylene chloride.

The solutions were used for drawing off polycarbonate foils at a width of 200 mm on a Coatmaster 509 MC automatic foil- or film-drawing applicator from Erichson, with evaporation of the solvent (at 30° C. and 5 mm/s doctor advance rate). The thickness of the resultant foils was about 50 µm, and they were cut to size (50×50 mm) for production of the multilayer composite.

3. Production of Multilayer Foil Composite:

Each of the cast foils obtained from compounded materials 1-8 was pressed for 5 minutes onto a foil composed of Makrolon M3108 (available commercially or produced in-house) in a PN200 heated press from Pual Otto Weber, using a pressure of 200 kN, at various temperatures (150, 140, 130 and 120° C.). The multilayer foil composite here comprising the cast foil from compounded material 1 is termed "system 1", and that derived from compounded material 2 is termed "system 2", etc. Corresponding terms are used for the other multilayer foil composites.

4. Testing of Multilayer Foil Composites of Systems 1-8 and of a Commercially Available Foil:

Adhesion between the layers of systems 1-8 was assessed by testing for delamination. The procedure here was as follows:

Evaluation and Grading:

Attempts are made to delaminate the foils. The more difficult this is, the more assessment points are awarded (0=very easy, 6=very difficult). A visual assessment is also made as to the quality of bonding of the foils (0=poor, 6=very good). The better the result, the more points awarded. The foils without additive (blind value 1 and 2) served as comparisons. Blind value 1 was produced in-house, and blind value 2 is a commercially available foil from Bayer MaterialScience AG (Makrofol ID).

The points described after this were totaled. FIG. 1 shows a graph of the result.

The experiments reveal the increased adhesion of the foils of the invention on lamination, in comparison with the two blind values 1 and 2. In particular, the composites reveal increased adhesion even at relatively low lamination temperatures.

The invention claimed is:

1. A smart ID card, identification document, portable data carrier, EC card, health card, credit card, or mobile-telephone card comprising a multilayer foil composite comprising a layer comprising polycarbonate or copolycarbonate and an additive selected from the group of the compounds of the formulas (1) to (8) and mixtures thereof:

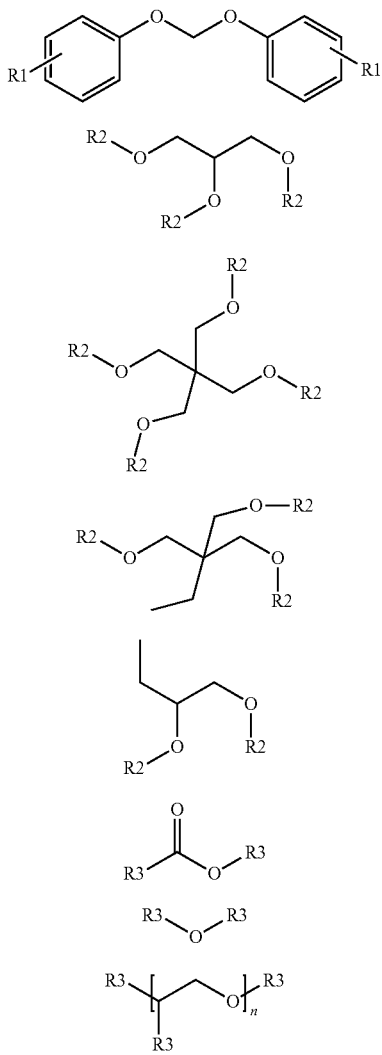

wherein
R1 represents, independently of one another, a substituent selected from the group consisting of C10-C25-alkyl, C10-C25-alkoxy, and C10-C25-alkyl-substituted aryl,
R2 represents, independently of one another, a substituent selected from the group consisting of C10-C25-alkyl-carbonyl and hydrogen and
R3 represents, independently of one another, a substituent selected from the group consisting of C10-25-alkyl;
wherein the additive is present in an amount of from 2.1 to 3.3%, based on the weight of the composite;
wherein the multilayer foil composite comprises 2 or more polymeric layers bonded to one another via coextrusion or lamination; and
wherein the multilayer foil composite exhibits improved adhesion.

2. The smart ID card, identification document, portable data carrier, EC card, health card, credit card, or mobile-telephone card according to claim 1, wherein the additive is selected from the group consisting of pentaerythritol tetrastearate, glycerol monostearate, propanediol distearate, stearyl stearate and mixtures thereof.

3. The smart ID card, identification document, portable data carrier, EC card, health card, credit card, or mobile-telephone card according to claim 1, wherein the composite has a thickness of from 0.1 to 2 mm.

4. The smart ID card, identification document, portable data carrier, EC card, health card, credit card, or mobile-telephone card according to claim 1, wherein the layer is a coextruded foil.

5. A process for the production of a smart ID card, identification document, portable data carrier, EC card, health card, credit card, or mobile-telephone card according to claim 1, comprising laminating a foil comprising the layer comprising polycarbonate or copolycarbonate and an additive to another foil.

6. The smart ID card, identification document, portable data carrier, EC card, health card, credit card, or mobile-telephone card according to claim 1, wherein the additive does not comprise glycerol monostearate.

7. The smart ID card, identification document, portable data carrier, EC card, health card, credit card, or mobile-telephone card according to claim 1, wherein R3 represents a linear C10-C25 alkyl.

8. The smart ID card, identification document, portable data carrier, EC card, health card, credit card, or mobile-telephone card according to claim 1, wherein the additive is selected from the group consisting of compounds of the formulas (1) to (5), (7), (8), and combinations thereof.

9. The smart ID card, identification document, portable data carrier, EC card, health card, credit card, or mobile-telephone card according to claim 1, wherein the additive is selected from the group consisting of pentaerythritol tetrastearate, propanediol distearate, stearyl stearate and mixtures thereof.

10. The smart ID card, identification document, portable data carrier, EC card, health card, credit card, or mobile-telephone card according to claim 1, wherein the multilayer foil composite comprises at least two different polymeric layers.

11. The smart ID card, identification document, portable data carrier, EC card, health card, credit card, or mobile-telephone card according to claim 1, wherein the multilayer foil composite comprises at least two of the same polymeric layer.

12. A smart ID card, identification document, portable data carrier, EC card, health card, credit card, or mobile-telephone card comprising a multilayer foil composite comprising a layer comprising polycarbonate or copolycarbonate and an additive selected from the group of the compounds of the formulas (3) to (8) and mixtures thereof:

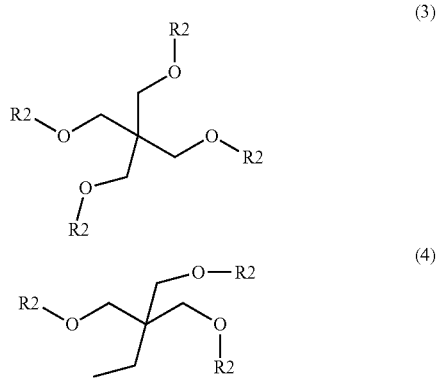

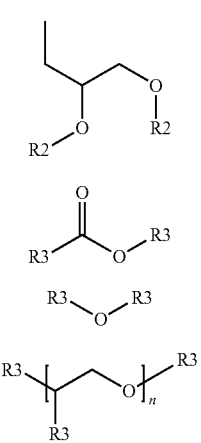

(5)

(6)

(7)

(8)

wherein

R2 represents, independently of one another, a substituent selected from the group consisting of C10-C25-alkyl-carbonyl and hydrogen and R3 represents, independently of one another, a substituent selected from the group consisting of C10-25-alkyl;

wherein the additive is present in an amount of from 2.1 to 3.3%, based on the weight of the composite;

wherein the multilayer foil composite comprises 2 or more polymeric layers bonded to one another via coextrusion or lamination; and wherein the multilayer foil composite exhibits improved adhesion.

13. A smart ID card, identification document, portable data carrier, EC card, health card, credit card, or mobile-telephone card comprising a multilayer foil composite comprising a layer comprising polycarbonate or copolycarbonate and an additive selected from the group of the compounds of the formulas (4) to (8) and mixtures thereof:

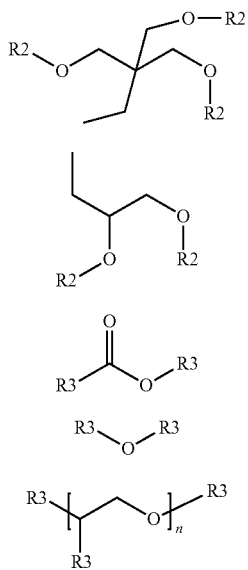

(4)

(5)

(6)

(7)

(8)

wherein

R2 represents, independently of one another, a substituent selected from the group consisting of C10-C25-alkyl-carbonyl and hydrogen and R3 represents, independently of one another, a substituent selected from the group consisting of C10-25-alkyl;

wherein the additive is present in an amount of from 2.1 to 3.3%, based on the weight of the composite;

wherein the multilayer foil composite comprises 2 or more polymeric layers bonded to one another via coextrusion or lamination; and wherein the multilayer foil composite exhibits improved adhesion.

* * * * *